Figure 1:
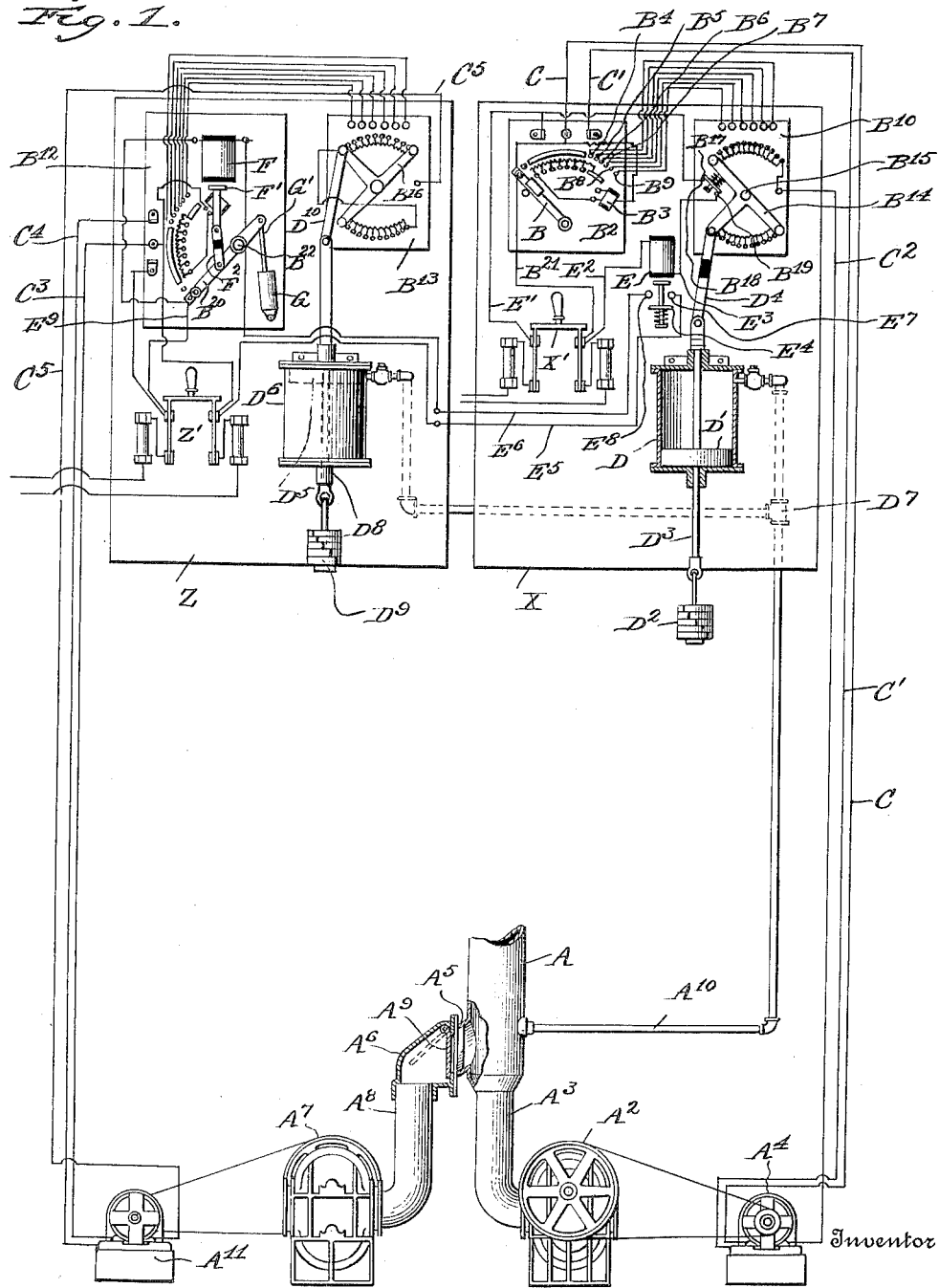

A. W. PEARSALL.
CONTROLLING MECHANISM FOR PNEUMATIC DESPATCH TUBE APPARATUS.
APPLICATION FILED JULY 15, 1912.

1,097,559.

Patented May 19, 1914.
2 SHEETS—SHEET 2.

UNITED STATES PATENT OFFICE.

ALBERT W. PEARSALL, OF LOWELL, MASSACHUSETTS, ASSIGNOR TO THE LAMSON COMPANY, OF BOSTON, MASSACHUSETTS, A CORPORATION OF NEW JERSEY.

CONTROLLING MECHANISM FOR PNEUMATIC-DESPATCH-TUBE APPARATUS.

1,097,559.     Specification of Letters Patent.     Patented May 19, 1914.

Application filed July 15, 1912. Serial No. 709,474.

*To all whom it may concern:*

Be it known that I, ALBERT W. PEARSALL, of Lowell, in the county of Middlesex and State of Massachusetts, have invented certain new and useful Improvements in Controlling Mechanism for Pneumatic - Despatch-Tube Apparatus, of which the following is a specification.

My invention relates to the control and the automatic starting of an electric motor or motors when used to operate exhausters or positive pressure blowers used to generate a fluid pressure no greater than that used in the transmission tubes of a pneumatic despatch tube system, and at the same time to supply fluid pressure, so that it shall be instantaneously ready for transmitting purposes, all with the use of substantially the minimum amount of electric force.

The main object of this invention is to provide an ever ready transmitting force, and with the expenditure of practically more power than that required to perform the transmitting service. This is in contradiction to present power generating equipments operated with electric motors intended to economize in the operating expense of pneumatic despatch tube systems; first for example, in that type using small positive blowers or exhausters which are operated with series motors which start and stop. Such systems are usually of limited capacity since only small motors will permit of their being started by having the current thrown in them at once, and they are also limited to the use of small blowers or exhausters, as the sudden starting of this class of machinery from rest requires the use of enormous power which causes an excessive over load on the motors. In such systems, too, if shunt motors are contemplated for use the time required to bring the blower or exhauster from rest to the speed required for generating an efficient transmitting force is too great to permit of such use where rapid service is required. The present system having, as it does, for its main object that above referred to, is further essentially different from the type of systems of pneumatic despatch tubes which are operated by a pressure in excess of that of the atmosphere and which are provided with storage tanks in which compressed air is stored at a pressure greater than that used to operate the transmission tubes, the said pressure being reduced by means of a reducing valve before being used in the transit tubes. It will readily be seen that all power expended in compressing this air to a pressure greater than that required for transmission purposes is an expenditure of energy without useful effect and, therefore, does not permit of the economy of power at which my invention aims.

Another object of my invention is to provide a power equipment that will be sufficiently elastic to meet the maximum demands of the service for any number of lines and any size transmission tube, at the same time permitting, when no service is required, the use of what is technically known as a closed system without an increase of pressure. This cannot now be accomplished with a single unit as the range of speed variation of the operating motor is limited by reason of electrical inefficiency.

The general nature of my invention is as follows: The transmission tubes or circuits of a pneumatic despatch tube system equipped with any of the well known power control devices (devices which automatically establish a flow of air in the transit tube when carriers are introduced and automatically arrest the flow of air in such transit tube upon delivery of the last carrier in transit) are connected to a suitable supply pipe, which is connected, according to the nature of the system, to either the compression or vacuum side of the exhausters or blowers. These exhausters or blowers are operatively connected to electric motors preferably of the variable speed shunt field control type. One exhauster or blower with its motor is operated at its minimum speed, when no carriers are in transit; the other exhauster or blower and its motor being normally substantially at rest and only in operation when the demands of the transmission service exceed the capacity of the power unit normally in operation. The speed of the motors operating these power units is controlled by field regulating rheostats actuated by the fluctuations in the fluid pressure generated primarily by the normally operating power unit; and secondarily, by the fluctuations in the fluid pressure generated by both power units. The cylinder of each field regulating or controlling rheostat of each power unit is connected to a portion of the supply pipe which is separated by a check valve from the power unit which is normally at rest, so that there is provided a supply of motive power to the cylinder of the controlling rheostat of the motor of the power unit normally at rest to the end that the latter unit need not normally be started with a weakened field. This check valve also prevents the force generated by the power unit normally in operation from operating the unit at rest or offering resistance when it is being started. To insure that the power unit intended to be normally in operation is so controlled, a counter balance on the piston rod of the mechanism used to operate the field controlling rheostat of the motor of this unit is made slightly heavier than that on the piston of the mechanism used to operate the field controlling rheostat of the motor used to operate the power unit normally at rest.

Figure 2:
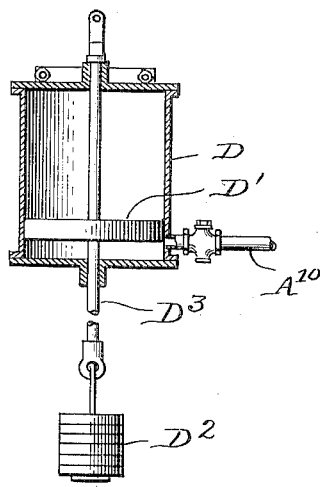
Figure 3:
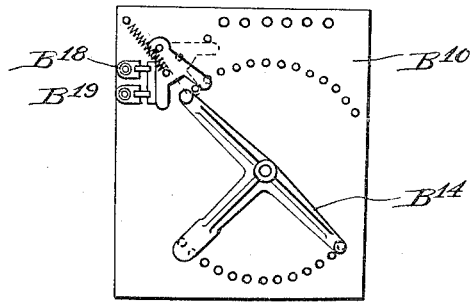

In the accompanying drawings which illustrate a preferred form of construction embodying my invention: Figure 1 is a front elevation of the controlling panels showing their connection with the operating machinery, with each other and with the main electric feed wires. Fig. 2 is a front sectional elevation of the cylinder and piston arranged to operate the speed controlling rheostat when a fluid pressure in excess of that of the atmosphere is used to operate the despatch tube system. Fig. 3 shows a modified form of a circuit closing means adapted to be substituted for plate $B^{17}$ and contact posts $B^{18}$ and $B^{19}$.

Like letters of reference refer to like parts throughout the several views.

In Fig 1, A is a drum to which the several lines of the pneumatic despatch tube system are connected and which is in turn connected with the blower $A^2$ by the pipe $A^3$, the blower $A^2$ being adapted to be driven by the motor $A^4$. To the drum A is also connected a branch T $A^5$ and controlling communication with the T $A^5$ is a check valve $A^6$ in which the flap valve $A^9$ is movably mounted and when not seated can swing in the direction shown in dotted out line, to the check valve $A^6$ is attached the pipe $A^8$ connecting with the blower $A^7$, which is adapted to be driven by the motor $A^{11}$. The blower $A^2$ driven by its motor $A^4$ is to be considered as the primary power unit as shown in Fig. 1 and the blower $A^7$, and its motor $A^{11}$ as the secondary power unit; the motor of the primary power unit $A^4$ being controlled in its operation by the apparatus mounted on the primary controlling panel X and the motor of the secondary power unit $A^{11}$ by the apparatus mounted on the secondary controlling panel Z. Mounted on the primary controlling panel X is the cylinder D and upon the secondary panel Z the cylinder $D^6$ both being in communication with the drum A through the pipe $A^{10}$ and T $D^7$. Within the cylinder D is the piston $D'$ attached to the piston rod $D^3$ which carries at its lower end the adjustable weight $D^2$ and is connected at its upper end with the field controlling rheostat $B^{14}$ by the insulator link $D^4$, and within the cylinder $D^6$ is the piston $D^5$ attached to the piston rod $D^8$ which carries at its lower end the adjustable weight $D^9$ and is connected at its upper end with the field controlling arm $B^{16}$ by the insulator link $D^{10}$. Upon the primary controlling panel X is also mounted the manually operated starting rheostat $B^2$ and the motor field controlling rheostat $B^{10}$ which are connected by the wire $B^4$, without resistance, and by the wires $B^5$, $B^6$, $B^7$, $B^8$ and $B^9$, with increasing resistance, the manually operated motor starting rheostat $B^2$ being placed in circuit with the source of electric supply by the double pole switch $X'$ and the wires $E'$ and $B^{21}$; and the motor $A^4$ being connected to the starting rheostat $B^2$ by the shunt field and armature wire C and the armature wire $C'$; the shunt field wire $C^2$ connecting the field controlling rheostat $B^{10}$ and the motor $A^4$.

Carried upon the field controlling rheostat arm $B^{14}$ and insulated therefrom is the contact plate $B^{17}$ adapted to contact with the contact posts $B^{18}$ and $B^{19}$, completing a circuit in the main line solenoid switch E through double pole switch $X'$, wire $E'$, contact post $B^{18}$, contact plate $B^{17}$, contact post $B^{19}$, wire $E^3$, solenoid E and wire $E^2$. When the solenoid E is energized, its armature carrying the contact plate $E^4$, rises and by coming into engagement with contact posts $E^7$ and $E^8$ completes a circuit in the solenoid motor starting rheostat $B^{12}$ (which is mounted on the secondary controlling panel Z) in the following manner: Assuming that the double pole switch $Z'$ is closed in the main electric supply circuit, current will flow through the wire $E^5$, contact post $E^7$, contact plate $E^4$, contact post $E^8$, wire $E^6$, solenoid F of the solenoid motor starter $B^{12}$, via wire $E^9$ again to the double pole switch $Z'$; the solenoid F of the solenoid motor starter $B^{12}$ being energized and its armature $F'$, which is connected to the contact lever $B^{20}$ being caused to move upward, rotating the contact lever $B^{20}$ on its pivot $B^{22}$. The speed of this movement is controlled through the connection to the piston rod $G'$ of the dashpot G. The solenoid motor starting rheostat $B^{12}$ is connected by six wires to the field controlling rheostat $B^{13}$ in identically the same way as shown by wires $B^4$, $B^5$, $B^6$, $B^7$, $B^8$, and $B^9$ on primary panel X. The motor $A^{11}$ is connected to the solenoid motor starting rheostat $B^{12}$ by the shunt field wire $C^3$ and the armature wire $C^4$, and with the field controlling rheostat $B^{13}$ by the wire $C^5$.

The operation of this controlling apparatus is as follows: The double pole switch of the primary controlling panel X is closed and the contact arm B of the manually operated motor starting rheostat $B^2$ is rotated gradually until it comes into engagement with the retaining magnet $B^3$ when it will have caused the motor $A^4$ and the blower $A^2$, to which it is operatively connected, to have started and to have speeded up through the introduction of some field resistance through connection made by the wires $B^5$, $B^6$, $B^7$, $B^8$ and $B^9$, causing the blower, which is operated in this instance as an exhauster, to create a pressure below that of the atmosphere sufficient to overcome the counter weight $D^2$ causing the piston $D'$ in the cylinder D to rise and through its piston rod $D^3$ and the insulator link $D^4$ connecting this rod with the contact arm $B^{14}$ of the field controlling rheostat $B^{10}$ thereby causes said arm to assume a position corresponding to that in which is shown the arm $B^{16}$ of the field controlling rheostat $B^{13}$ of the secondary panel Z. The adjustable counterweight $D^2$ of the primary panel X is slightly heavier than the adjustable counterweight $D^9$, and hence since both the cylinders D and $D^6$ are connected by the pipe $A^{10}$, the piston $D^5$ in the cylinder $D^6$ will also, under the conditions stated, have risen, causing its piston rod $D^8$ with the insulator link $D^{10}$ connecting the contact arm $B^{16}$ of the field controlling rheostat $B^{13}$ and, of course, to assume the position shown on the secondary panel Z in Fig. 1. The primary power unit, being controlled by the apparatus mounted on the panel X, will now be operating under its minimum service condition with the contact arm $B^{14}$ of the field controlling rheostat $B^{10}$ rotated clockwise to the extent of its movement in this direction. If one or more of the transmission tubes which are connected to the drum A, and which are controlled by timing valves normally closed when not in use, be placed in operation by the opening of the timing valve, or valves, to which they are connected, it will be seen that a departure from the pressure below that of the atmosphere at which the system was maintained (resulting in a lessening of the vacuum in drum A) will take place, and that under the influence of the adjustable weight $D^2$, the piston $D'$ which is fixed to the piston rod $D^3$ and which is connected to the field controlling rheostat arm $B^{14}$ by the insulator link $D^4$, will move downward causing the field controlling rheostat contact arm $B^{14}$ to rotate counterclockwise on its pivot $B^{15}$ toward the position in which this arm is shown in Fig. 1, causing the motor A to increase in speed by cutting in resistance in its field, and causing the blower $A^2$, which it operates, to displace a quantity of air sufficient to meet the service requirement at the pressure determined by the adjustable weight $D^2$. If the service load conditions continue to increase by the use of additional transit tubes, the contact arm $B^{14}$ carrying the contact plate $B^{17}$ will finally assume the position shown in Fig. 1, causing its contact plate $B^{17}$ to contact with the contact posts $B^{18}$ and $B^{19}$, thereby completing the circuit adapted to energize the solenoid of the main line solenoid switch E; causing its armature to rise carrying the contact plate $E^4$ into engagement with contact posts $E^7$ and $E^8$ and thereby closing the circuit adapted to energize the solenoid F of the solenoid motor starting rheostat $B^{12}$. The armature $F'$ of the latter, which is connected to the contact lever $B^{20}$ therefore rises, rotating the contact lever $B^{20}$ on its pivot $B^{22}$ and causing the motor $A^{11}$ and blower $A^7$ to start and speed up; displacing a quantity of air sufficient to overcome the slippage of the blower at the pressure for which the adjustable weight $D^9$ is set, which pressure is slightly less than that carried by the primary power unit so as to insure that the field controlling contact arm $B^{16}$ of the field controlling rheostat $B^{13}$ will be maintained in the strong field position when the motor $A^{11}$ is automatically thrown in by the solenoid motor starter $B^{12}$. The operation of additional transit lines will now further break the vacuum which will cause the piston $D^5$ in the cylinder $D^6$, which is fixed to the piston rod $D^8$ and which is connected to the field controlling rheostat arm $B^{16}$ by the insulator link $D^{10}$, to move downward under the influence of the adjustable weight $D^9$, causing the contact arm $B^{16}$ to rotate in the direction to cut in resistance in the field circuit of the motor $A^{11}$, thereby speeding up said motor and its blower $A^7$ to displace the quantity of air required and at the pressure determined by the adjustable weight. The air thus being displaced will be drawn through the check valve casing $A^6$, the flap valve $A^9$ being unseated and both blowers $A^2$ and $A^{11}$ will then be displacing a quantity of air sufficient for the operation of the transmission tube lines that are delivering air to the drum A by reason of the opening of their controlling valves; and this air will be at a pressure determined by the adjustable weight $D^9$. It is apparent that as closure of the controlling valves of the transmission tubes take place, a restriction of the flow of air into the drum A will occur and, owing to the displacement of the blowers at the speed at which they are being driven, an increase of pressure below that of the atmosphere will be established; causing the piston $D^5$ in the cylinder $D^6$ of the secondary panel Z to rise and, through its connection with the field controlling rheostat arm $B^{16}$, cause it to rotate in the direction to assume the position shown in Fig. 1, cutting out resistance in the field of the motor $A^{11}$ and causing the latter and the blower $A^7$ driven thereby to slow down. Through the closure of enough transmission tube controlling valves blower $A^7$ will have its speed reduced to its minimum and at such time the field controlling contact arm $B^{16}$ of the secondary panel Z will be in the position shown in Fig. 1 and the field controlling contact arm $B^{14}$ of the primary controlling panel X will be in the position in which this part is shown in Fig. 1, which will maintain the primary power unit in operation at its maximum. A further closure of transmission tube controlling valves will result in increasing the vacuum, or in other words the effective pressure below that of the atmosphere, sufficient to cause the piston $D'$ to begin to ascend against the resistance offered by the adjustable weight $D^2$, and through its connection to rotate clockwise the field controlling contact arm $B^{14}$, causing the maintaining circuit in the main line solenoid switch to be broken by the disengagement of contact plate $B^{17}$ from contact posts $B^{18}$ and $B^{19}$ and thus deënergizing the solenoid E; permitting its armature carrying the contact E to fall and thereby break the energizing circuit of solenoid F of the solenoid motor starter $B^{12}$, which in turn causes the motor $A^{11}$ together with the blower $A^7$ which it operates to come to a state of rest. The flap valve $A^9$ in the check valve $A^6$ will now be seated, preventing the air which is being displaced by the primary power unit from reversely rotating the second power unit. A complete closure of all the transmission tube controlling valves will result in restricting the air displacement of the blower of the primary unit to a volume equal to its slippage at the pressure determined by the adjustable weight $D^2$, which will cause the piston $D'$ to ascend to its uppermost travel and, through its connection with the contact arm $B^{14}$ of the field controlling rheostat $B^{10}$, to cut out resistance in the field circuit of the motor $A^4$ to cause the latter to operate, together with the blower $A^2$ which it drives, at its minimum speed. In general, therefore, it will be seen that I have provided a system comprising a plurality of power units which are adapted to co-act under determined ventage conditions of the conduit or system in general, to maintain a flow of air through said conduit or drum A; the latter serving in effect as a reservoir for the plurality of transit tubes used in the system.

The pistons $D'$ and $D^1$, together with their associated parts and respective rheostats, together constitute automatic means for variably controlling the speed at which the respective power units are operated, in accordance with service conditions in the system.

The check valve proper $A^9$ constitutes, in the preferred construction, a provision for insuring against a reverse operation of one of the power units by another of the same; although it is obvious that various other provisions adapted to accomplish the same purpose might be employed to this end.

In the patent to Fordyce and Jennings, 1,009,400, dated November 21, 1911, there is disclosed a system in which it was aimed to maintain a predetermined working vacuum and to this end fluid pressure controlled means was provided, the actuation of which was adapted to effect the automatic cutting in or cutting out of separate motors in a series of the same.

I am aware that in the patent to Dunbar, 977,079, dated November 29, 1910, a mechanism was described which in certain respects is not dissimilar to certain portions of the herein described apparatus, but it will be noted that in the Dunbar construction but a single motor or power unit is employed, while in the present case a plurality of motors are utilized, as in the said Patent 1,009,400.

My present construction possesses material advantages over either of the constructions described in the patents just referred to in that the change in effort or force exerted to displace air through the conduit is effected very gradually and through a great range without unduly multiplying the number of motors involved and without using a single motor, which obviously cannot be economically operated through a wide range of speeds.

The present system is primarily designed to effect economy of operation, and this, it is believed, the system accomplishes to the maximum.

Having thus described the nature of my invention and set forth a construction embodying the same, what I claim as new and desire to secure by Letters Patent of the United States is:

1. A pneumatic despatch tube system comprising a conduit, a plurality of power units adapted to co-act to jointly maintain a flow of air through said conduit, and automatic means for variably controlling the speed at which the respective power units are operated in accordance with service conditions in said system, said system including provisions for insuring against a reverse operation of one of said power units by another of the same.

2. A pneumatic despatch tube system comprising a conduit, a plurality of power units one at least of which is normally operatively connected to said conduit, and adapted to maintain a flow of air therethrough, means movable to establish communication between a second of said power units and said conduit, in accordance with service conditions in said system, and means for variably controlling said power units in accordance with said conditions.

3. A pneumatic despatch tube system comprising a conduit, a plurality of power units one at least of which is normally operatively connected to said conduit, and adapted to maintain a flow of air therethrough, means movable to establish communication between a second of said power units and said conduit, in accordance with service conditions in said system, and means for variably controlling one at least of said power units in accordance with said conditions.

4. A pneumatic despatch tube system comprising a conduit, a plurality of power units one at least of which is normally operatively connected to said conduit, and adapted to maintain a flow of air therethrough, means movable to establish communication between a second of said power units and said conduit, in accordance with service conditions in said system, and separate means for individually controlling said power units in accordance with said conditions.

5. A pneumatic despatch tube system comprising a conduit, a plurality of power units adapted to co-act to jointly establish a flow of air through said conduit, and automatic means for variably controlling the speed at which the respective power units are operated in accordance with service conditions in said system, said system including provisions for rendering substantially inoperative one of said power units when a determined pressure is established in said conduit, said provisions leaving portions at least of said automatic means free to variably control another of said power units in accordance with said service conditions so long as the pressure in said conduit ranges between a second predetermined pressure and that first mentioned.

6. A pneumatic despatch tube system comprising a conduit, a plurality of power units adapted to co-act to jointly establish a flow of air through said conduit, and automatic means for variably controlling the speed at which the respective power units are operated, in accordance with service conditions in said system, said system including provisions for rendering substantially inoperative one of said power units when a determined pressure is established in said conduit, said provisions leaving portions at least of said automatic means free to variably control another of said power units in accordance with said service conditions at least so long as the pressure in said conduit ranges between a second predetermined pressure and that first mentioned.

7. A pneumatic despatch tube system comprising a conduit, a plurality of power units adapted to co-act to jointly establish a flow of air through said conduit, and automatic means for variably controlling the speed at which the respective power units are operated, said automatic means having provisions for successively variably controlling said respective power units.

8. A pneumatic despatch tube system comprising a conduit, a plurality of power units adapted to co-act to jointly establish a flow of air through said conduit, and automatic means for variably controlling the speed at which the respective power units are operated, a portion of said automatic means being operative to variably control one of said power units after another portion of said means has substantially ceased to variably control another of said power units.

9. A pneumatic despatch tube system comprising a conduit, means for maintaining a determined flow of air under a determined pressure through said conduit under determined ventage conditions in the latter, and separate, independently acting means for variably changing said flow of air while substantially maintaining said determined pressure, in accordance with changes in said ventage conditions.

10. A pneumatic despatch tube system comprising a conduit, means, including a power unit, for maintaining a determined flow of air under a determined pressure through said conduit under determined ventage conditions in the latter, and separate, independently acting means, including a second power unit, for variably changing said flow of air, while substantially maintaining said determined pressure, in accordance with changes in said ventage conditions.

11. A pneumatic despatch tube system comprising a conduit, a plurality of power units one of which is adapted to establish and maintain a flow of air through said conduit and a second of which is adapted to augment said flow of air, fluid pressure controlled means for automatically controlling the first of said power units, means for variably controlling the second of said power units in accordance with service conditions in said system, and connections between said two means and said conduit, one of said means having a tendency to respond to a change in fluid pressure in said conduit before the other of said means.

12. A pneumatic despatch tube system comprising a conduit, a plurality of power units one of which is adapted to establish and maintain a flow of air through said conduit and a second of which is adapted to augment said flow of air, fluid pressure controlled means for automatically variably controlling the first of said power units, means for variably controlling the second of said power units in accordance with service conditions in said system, and connections between said two means and said conduit, one of said means having a tendency to respond to a change in fluid pressure in said conduit before the other of said means.

In witness whereof, I have signed my name to this specification in the presence of two subscribing witnesses, this 12th day of July 1912.

ALBERT W. PEARSALL.

Witnesses:
M. G. MACMILLAN,
ISAAC KRAFSUR.